Dec. 11, 1956  N. R. SWAIN  2,773,398
TRANSMISSION CONTROL AND GUARD
Filed April 27, 1953
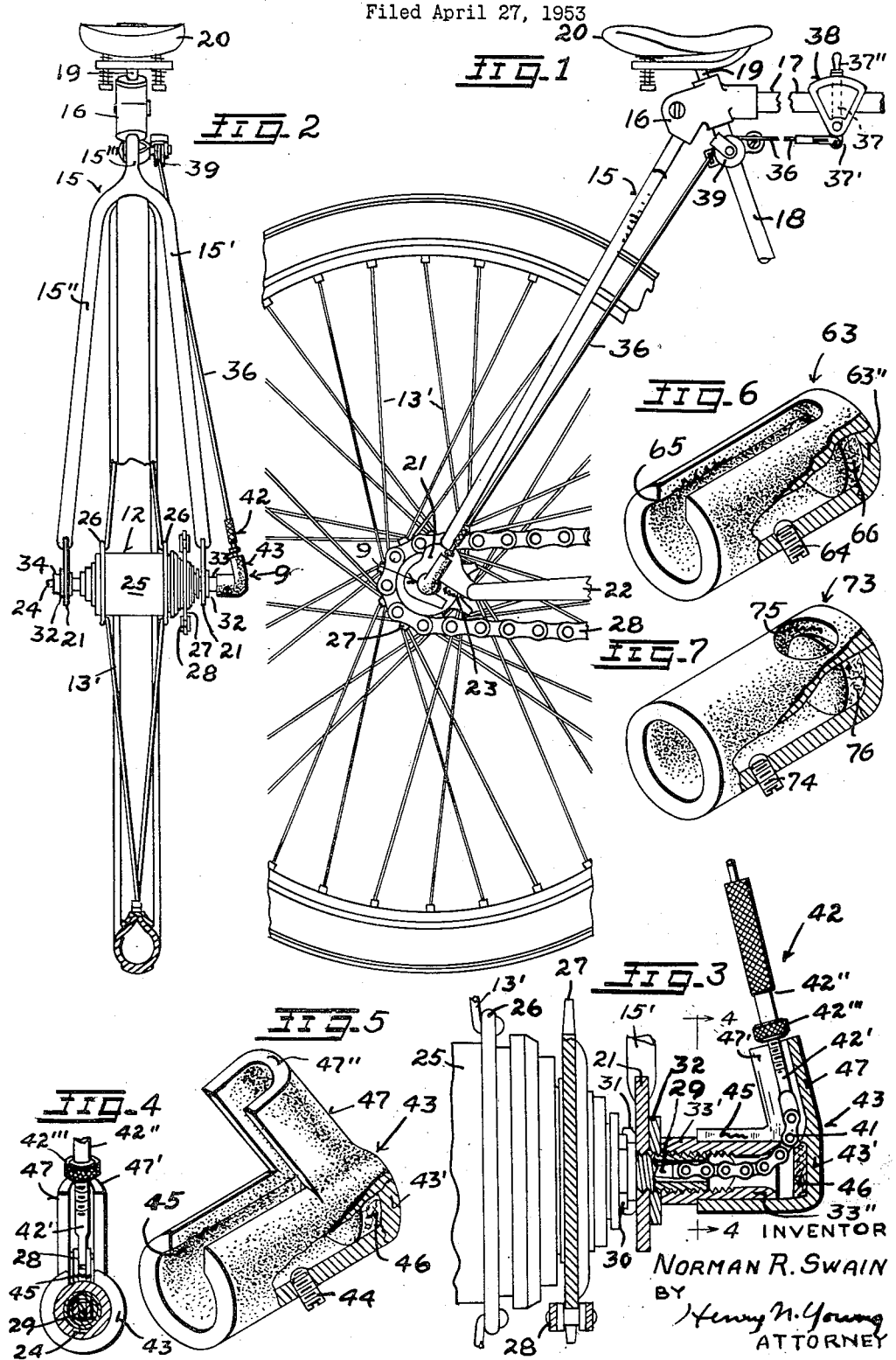
INVENTOR
NORMAN R. SWAIN
BY Henry N. Young
ATTORNEY

United States Patent Office 2,773,398
Patented Dec. 11, 1956

2,773,398

TRANSMISSION CONTROL AND GUARD

Norman R. Swain, San Leandro, Calif.

Application April 27, 1953, Serial No. 351,135

10 Claims. (Cl. 74—473)

The invention relates to a guard for a control line of a multi-speed wheel hub used in bicycles and other wheeled vehicles.

The general object is to provide a means for protecting the bend provided in a flexible control line at its point of emergence from a tubular axle which is supported by a wheel having a hub provided with a change-speed mechanism under setting control of the line.

A more specific object is to provide a control-line guard member which is mountable as an attachment on the axle of a wheel equipped with a multi-speed mechanism.

A further object is to provide a control-line guard member of the character described which is readily mountable and dismountable with respect to a control line while the line is operatively installed.

The invention possesses other objects and features of advantage, some of which, with the foregoing, will be set forth or be apparent in the following description of a typical embodiment thereof and in accompanying drawings, in which:

Figure 1 is a fragmentary side elevation of a bicycle showing the guard of my invention as applied to a change-speed control for the drive wheel of the bicycle.

Figure 2 is a fragmentary rear elevation of the bicycle showing the guard installation of Figure 1.

Figure 3 is an enlarged fragmentary view of a portion of the showing of Figure 2, and disclosing the structure in section at and adjacent the guard.

Figure 4 is a sectional view taken at the line 4—4 in Figure 3.

Figure 5 is an enlarged perspective view of the guard member shown in Figures 1 to 4 inclusive, a portion of the member being broken away.

Figure 6 is a view of a simplified form of the guard member of Figure 5.

Figure 7 shows a still simpler embodiment of the guard member.

As particularly illustrated in Figures 1 to 4 inclusive, a guard member 9 of my invention is shown as operatively installed for the protection of a flexible pull line which is arranged for the control of the settings of a multi-speed transmission mechanism provided at the hub 12 of a drive wheel 13 of a bicycle 14. The general structure of the bicycle frame is a usual one, and includes a rear fork 15 spanning the hub 12 axially thereof and extending obliquely downwardly from a frame member 16, said fork comprising tubular side portions 15' and 15" extending from a tubular stem portion 15''' which is fixed to the member 16. A tubular frame member 17 extends forwardly from the member 16 to the front of the bicycle at its steering post (not shown), and a tubular frame member 18 extends obliquely forwardly and downwardly from beneath the member 16 to the mounting for the drive sprocket (not shown) of the bicycle. As indicated, the member 18 and member 16 cooperatively provide a socket for receiving a usual seat post 19 for a seat 20.

It will now be noted that the sides 15' and 15" of the fork portion of the member 15 terminate at flat plates 21 which are integrally connected to them, and have tubular frame members 22 extending forwardly therefrom to the mounting for the drive sprocket (not shown). Like slots 23 extend rearwardly and correspondingly from forward points of the plates 21 which are below the points of attachment of the frame members 22 to the plates and receive end portions of the hub-carrying axle 24 for adjustment therealong. The wheel hub shell 25 provides fixed spaced circumferential flanges 26 at which the inner ends of the whel spokes 13' are attached, and the hub shell 25 coaxially mounts a driven sprocket 27 between the plate 21 of the fork side 15' and the adjacent spoke-anchoring flange 26, said sprocket being engaged by a continuous drive chain 28 extending to the drive sprocket (not shown) of the bicycle. The sprocket 27 is operatively connectible to the hub 12 for rotation therewith by means of a change-speed transmission mechanism, such mechanism being well known in the art and being presently represented by a controlling drawbar 29 which is shown in part in Figure 3 within a tubular end portion of the axle 24. For pedal-operated bicycles, the mechanisms provided at the hub 12 may also house a usual coaster-brake device (not shown).

As is customary, end portions of the wheel-carrying axle 24 are provided with flanges 30, mount lock washers 31 between the flanges and the plates 21, mount lock washers 32 at the outer faces of the plates 21, and threadedly mounted nuts 33 and 34 on the different extending portions thereof for non-rotatively fixing the shaft ends to the plates while they are engaged in the slots 23. The arrangement provides for such adjusted positionings of the axle ends in the slots 23 that the chain 28 may be of requisite operative tightness while the wheel is centered within the forks of the frame members 15 and 22, this manner of mounting a drive wheel axle on a bicycle frame comprising a usual one. For bicycle wheel hubs equipped with change-speed transmission devices, one end portion of the axle is tubular, and the other locknut 32 mounted thereon customarily, but not necessarily, extends beyond the axle extremity to provide an extension of the axle bore.

As is particularly brought out in Figure 3, the shaft end adjacent the wheel sprocket 27 has the nut 33 thereon provided with an inner portion 33' of polygonal form for engagement by a wrench and a smaller cylindrical outer portion 33", and the control drawbar 29 of the change-speed mechanism is reciprocable in the shaft bore threat for its positioning control by a flexible pull line extending from the outer end of the drawbar 29 to a higher point on the bicycle frame which is readily accessible to a rider of the bicycle. In the present structure, a pull wire 36 extends from one arm 37' of a lever 37 extending from a quadrant assembly 38 of which the other lever arm comprises a setting handle 37'' arranged for its indexed positioning with respect to the scale of the quandrant; as shown, the quandrant 38 is mounted on the frame member 17 to dispose the setting handle 37'' within convenient reach of the occupant of the bicycle seat. The wire 36, which may comprise a single strand or be of multi-strand cable structure, extends around a direction-changing pulley 39 mounted on the frame member 18 and thence to a connection with the outer end of the drawbar 29 within the axle 24 and its nut extension 33''.

As shown, the connection between the drawbar 29 and the wire 36 is effected by means of a connecting section of link chain 41 which constantly extends through the nut 33 and beyond its outer end. To provide for the necessary change of direction required for the extension of the pull line to the quadrant 38, the chain 41 of the connection is bent around the extreme end of the nut 33 in sliding engagement with the end which is uniformly belled-out and rounded thereat to facilitate a sliding movement of the chain 41 against its terminal rim so provided, it being noted that the included angle of the chain portions at its bend is less than 90°. The interposed chain 41 is shown as fixed to the wire 36 at an adjustable connection 42 comprising a stem 42' threadedly engaged in a sleeve 42" in which the end of the wire 36 is axially fixed, and the stem 42' and sleeve 42" may be secured in longitudinally adjusted relation by means of a locknut 42''' mounted on the stem 42' and engageable with the opposed end of the sleeve 42". The combined wire-and-chain pull line thus provided between the change-speed drawbar 29 and the setting lever 37 is a usual one in the art.

With general reference to the pull lines controlling change-speed mechanisms of the present type, it has heretofore been customary to leave the bend portion of the pull line exposed at and beyond the bend and therefore subject to possible damage by striking or being struck by objects at that side of the bicycle, and it is the primary present purpose to provide an efficient guard device for the pull line portion providing said bend. As particularly illustrated in Figures 1 to 5 inclusive, the guard means 9 provided for the bend in the chain 41 comprises a member 43 which is arranged for mounting on the nut 33 and encloses the portion of the chain 41 at and beyond the end of the nut 33. The guard member 43 generally comprises a cap structure for telescopically receiving the cylindrical nut portion 33' to which it may be fixed by a setscrew 44 engaged in it; in the present instance, the member 43 may be installed in a limiting inward position with respect to the nut as determined by the engagement of its inner end with the shoulder provided at the juncture of the nut portions 33' and 33".

A radial opening 45 is provided in the side 43" of the guard 43 adjacent its closed end 43' and is arranged to freely receive the chain 41 therethrough for its extension generally radially of and beyond the cap. For facilitating the mounting of a guard member 43 on the shaft extension provided by the nut 33, the opening 45 may be extended to the inner end of the guard as is particularly illustrated; with a guard so formed, the same may be mounted or dismounted while the pull connection is operatively installed, the member being adjustably rotatable to provide for a free movement of the chain 41 through the outer end of the opening 45. To maintain the bearing of the pull chain with the shaft end, a disc 46 of felt or the like is preferably retainedly mounted in the closed end of the cavity of the guard against its end 43', said disc preferably being more or less oily to insure a wiping and lubricating engagement thereof by the chain whenever the same is shifted.

Since the adjustment range of the chain 41 of the pull line is relatively small and a portion of the chain constantly extends radially from the tubular guard portion which provides the opening 45, the guard member 43 is further formed to provide a constant protection for the extending chain portion and at least its hinged connection with the stem 42' of the connector 42 by which it is attached to the pull wire 36. As particularly illustrated, the guard member 43 is provided with a radial extension 47 at its opening 45 for constantly receiving the upwardly directed portion of the chain 41 and a major portion of the stem 48'. Preferably, and as shown, the extension 47 is of general channel section having its flange portions 47' extending inwardly toward the inner guard extremity from its intermediate portion 47" which comprises a lateral extension of the closed outer guard end 43'. Noting that the pull wire 36 for the pull line from the drawbar 29 within the axle end extends generally along the fork side 15' in angular relation to the central plane of the bicycle frame, the extension 47 makes an appropriate included angle of less than 90° with the guard axis, and so with the axis of the axle. It will be understood that an operatively mounted guard 43 of the present construction provides full protection for the pull line bend portion which is now commonly exposed and subject to possible damage by forcible contact with objects extraneous to the bicycle.

Figure 6 discloses a guard element 63 which lacks the extension 47 of the guard 43 and is otherwise formed the same, it being understood that this form of the guard does not protect the pull line above the bend therein at the effective extremity of the axle 24 provided by a locknut 33 mounted thereon and extending beyond it. The extension of the radial side opening 65 to the inner end of this guard member also facilitates its mounting and the application of the setscrew 64 while the pull line is fully installed. This embodiment also provides a positioning and lubricating disc 66 disposed within the guard and against its closed end 63".

The guard member 73 of Figure 7 comprises a cylindrical cap having its radial opening 75 arranged to freely receive the pull line and is of laterally closed and circular outline, whereby its mounting on an axle end may only be effected while the pull line which it is to protect is free beyond the axle end to provide for its threading through the opening 75. This embodiment of the guard member is otherwise the same as the embodiment of Figure 7 and is provided with a setscrew 74 and a positioning and lubricating disc 76. It will be understood that the guard 73 provides the minimum essential structure for a guard at a point of emergence of a pull line by which a setting of a change-speed mechanism in the hub of the drive wheel of a bicycle or the like is effected.

In view of the foregoing description of the illustrated similarly-functioning guard members 43 and 63 and 73, it will be understood that a most desirable protection is provided for the control line of a change-speed mechanism provided as part of a driven vehicle wheel, such as that of a bicycle or motorcycle. It will also be understood that the provision of any present guard member as a separate element for mounting on the protruding axle end provided by the nut exterior thereof having a uniform rounded extremity, permits any required rotative adjustment of the axle with respect to the vehicle frame in which it is fixed and an independent rotative adjustment of the guard to accommodate the control line at and adjacent its bend at the axle end. It will be further noted that a mounted present guard in no way interferes with the wheel chain or any guard provided therefor.

From the foregoing description taken in connection with the accompanying drawings, the advantages of the present guards will be readily understood by those skilled in the art to which the invention appertains. While I have described the principle of use, together with arrangements which I now consider to comprise preferred embodiments thereof, I desire to have it understood that the showings are primarily illustrative, and that such changes and developments may be made, when desired, as fall within the scope of the following claims,

I claim:

1. In a bicycle or the like, a frame, an axle extending through and between the sides of a fork portion of the frame and having a tubular end portion, a drive wheel having its hub mounted on the axle between the fork portions of the frame and provided with change-speed mechanism controlled by a flexible line extending through and from the bore of the tubular end portion of the axle, a nut mounted on the extending tubular portion of the axle and fixing the axle to the frame thereat and extending outwardly beyond the axle extremity to provide an extension of the axle bore receiving the flexible line longitudinally through its bore and radially from its extremity in direct sliding contact with its annular outer end face to provide a bend in the pull member thereat, and a guard member mounted on the extending nut portion and cooperative therewith to laterally enclose the pull line bend at the outer nut extremity.

2. In a bicycle or the like, a frame, a drive wheel having its hub provided with a change-speed mechanism under control of a flexible pull member, an axle non-rotatively fixed to the frame and intermediately mounting the wheel hub and having a tubular end portion extending from the frame, a tubular extension member mountedly receiving the extending end portion of the axle and providing an extension of the axle bore and having the flexible pull member extending from the change-speed mechanism and longitudinally through its bore and radially from its extremity in direct sliding contact therewith to provide a bend therein against the bore extremity, and a guard member removably and adjustably mounted on said extension member and cooperative with the member end to laterally enclose the bend thereat.

3. In a bicycle or the like, a frame, a drive wheel having its hub provided with a change-speed mechanism under control of a flexible pull line, an axle fixed to the frame and intermediately mounting the wheel hub and having a tubular end portion extending from a frame side, a tubular extension member mountedly receiving the extending end portion of the axle and providing an extension of the axle bore with said bore and having the pull line extending from the change-speed mechanism and longitudinally through it and radially from its extremity in sliding contact with the outer end of the extension member to provide a bend in the pull line thereat, and a guard member mounted on the extension member to extend therebeyond and cooperative with the member to laterally protect the pull line bend at the extremity thereof.

4. A structure in accordance with claim 3 in which the side of the guard member is tubular and is provided with a radial opening freely receiving the pull line therethrough at the bend of the latter.

5. A structure in accordance with claim 3 in which the side of the guard member is tubular and is provided with a slot which extends longitudinally along the member to its inner end and freely receives the radial portion of the flexible pull member therethrough radially of the member.

6. A structure in accordance with claim 3 in which the side of the guard member is tubular and is provided with a radial opening spaced from its outer end and freely receiving the flexible pull line therethrough at the bend thereof, and is further provided with a generally radial trough-like extension directed radially from the member at the opening and having its open side directed toward the inner guard end and freely receiving a pull line portion immediately beyond said bend thereof.

7. A structure in accordance with claim 3 in which the guard member has a tubular side and a closed outer end and is provided with a radial opening adjacent and inwardly of its closed end freely receiving the flexible pull line therethrough at the bend thereof.

8. A structure in accordance with claim 3 in which the guard member has a tubular side and closed outer end and has its side provided with a radial opening adjacent and inwardly of its closed end freely receiving the flexible pull line therethrough at the bend thereof, and an oily pad member is mounted within the guard member at its closed end and in engagement with the outer side of the bend.

9. A structure in accordance with claim 3 in which the guard member has a tubular side and a closed outer end and has its side provided with a radial opening spaced inwardly from its outer end and freely receiving the flexible pull line therethrough at the bend thereof, is provided with a generally radial trough-like extension extending radially from the member at the opening and freely receiving therethrough a pull line portion immediately beyond said bend, and is further provided with a yielding pad member mounted within it and engaged with and between its closed end and the outer side of the pull-line bend.

10. A structure in accordance with claim 3 in which the mounted extension member fixes the axle to the frame thereat.

References Cited in the file of this patent

UNITED STATES PATENTS

| | | |
|---|---|---|
| 882,845 | Sache | Mar. 24, 1908 |

FOREIGN PATENTS

| | | |
|---|---|---|
| 630 | Great Britain | Jan. 9, 1903 |
| 150,651 | Austria | Sept. 25, 1937 |